May 10, 1938.    V. CHARTENER    2,116,780
MACHINE FOR MAKING FABRICS
Filed Feb. 13, 1935    14 Sheets-Sheet 1

Fig.-1

INVENTOR
Victor Chartener,
By Archworth Martin,
Attorney.

May 10, 1938.  V. CHARTENER  2,116,780
MACHINE FOR MAKING FABRICS
Filed Feb. 13, 1935   14 Sheets-Sheet 5

INVENTOR
Victor Chartener,
By Archworth Martin,
Attorney.

May 10, 1938.   V. CHARTENER   2,116,780
MACHINE FOR MAKING FABRICS
Filed Feb. 13, 1935   14 Sheets-Sheet 6

INVENTOR
Victor Chartener,
By Archworth Martin,
Attorney

INVENTOR
Victor Chartener,
By Archworth Martin,
Attorney.

Patented May 10, 1938

2,116,780

UNITED STATES PATENT OFFICE 2,116,780

MACHINE FOR MAKING FABRICS

Victor Chartener, Monessen, Pa., assignor to Pittsburgh Steel Company, Pittsburgh, Pa., a corporation of Pennsylvania Application February 13, 1935, Serial No. 6,303

3 Claims. (Cl. 139—11)

My invention relates to a machine and a method of making fabrics, and is hereinafter described as employed in the making of wire fabrics, but it will be understood that various features of the invention can be employed in the making of other types of fabric.

As hereinafter described, the invention is shown as employed in the making of woven wire bands for fences or highway guards of the type shown in Patent No. 1,970,954, issued August 21, 1934, to Walter S. Edge.

One object of my invention is to provide a machine and a method whereby a minimum number of machine parts and movements are required in the assembling of the strand and stay members or wires into the fabric structure.

Another object of my invention is to provide an improved means for feeding crimped stays into assembled relation with the strands.

A further object of my invention is to provide means whereby the deflection of the strands to permit insertion of the stay wires may be of such limited degree as to avoid permanent bends in the strand wires.

Another object of my invention is to provide an improved means for bending the ends of the stay wires around the strands at the edges of the fabric.

Another object of my invention is to provide a simple and relatively inexpensive manner of making a plurality of narrow bands on a single machine.

Still another object of my invention is to provide a simple and cheap method and mechanism whereby fabrics of the character referred to may be more rapidly formed than has been possible with various devices of the prior art.

Apparatus for practising my invention is illustrated in the accompanying drawings, wherein.

Figure 1:
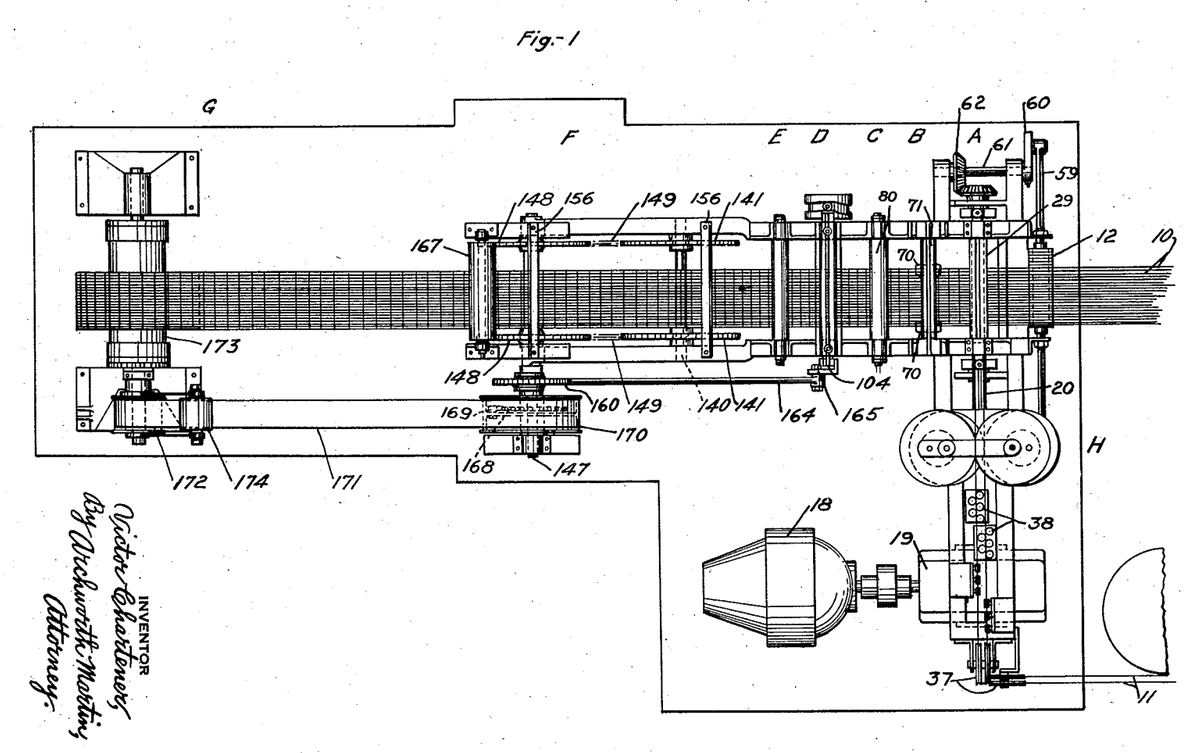
Figure 1 is a plan view of a fabric-making machine.
Figure 2:
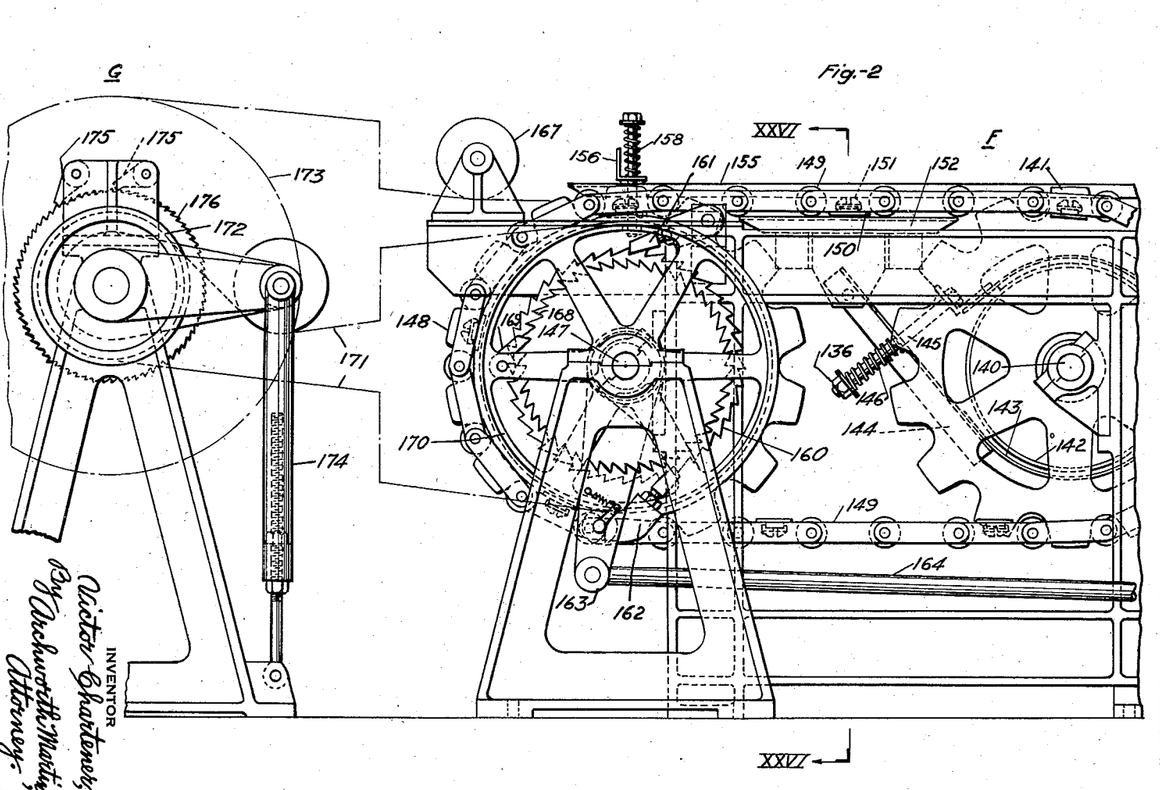
Figs. 2 and 3 are longitudinal sectional views of the structure of Fig. 1, on an enlarged scale.
Figure 3:
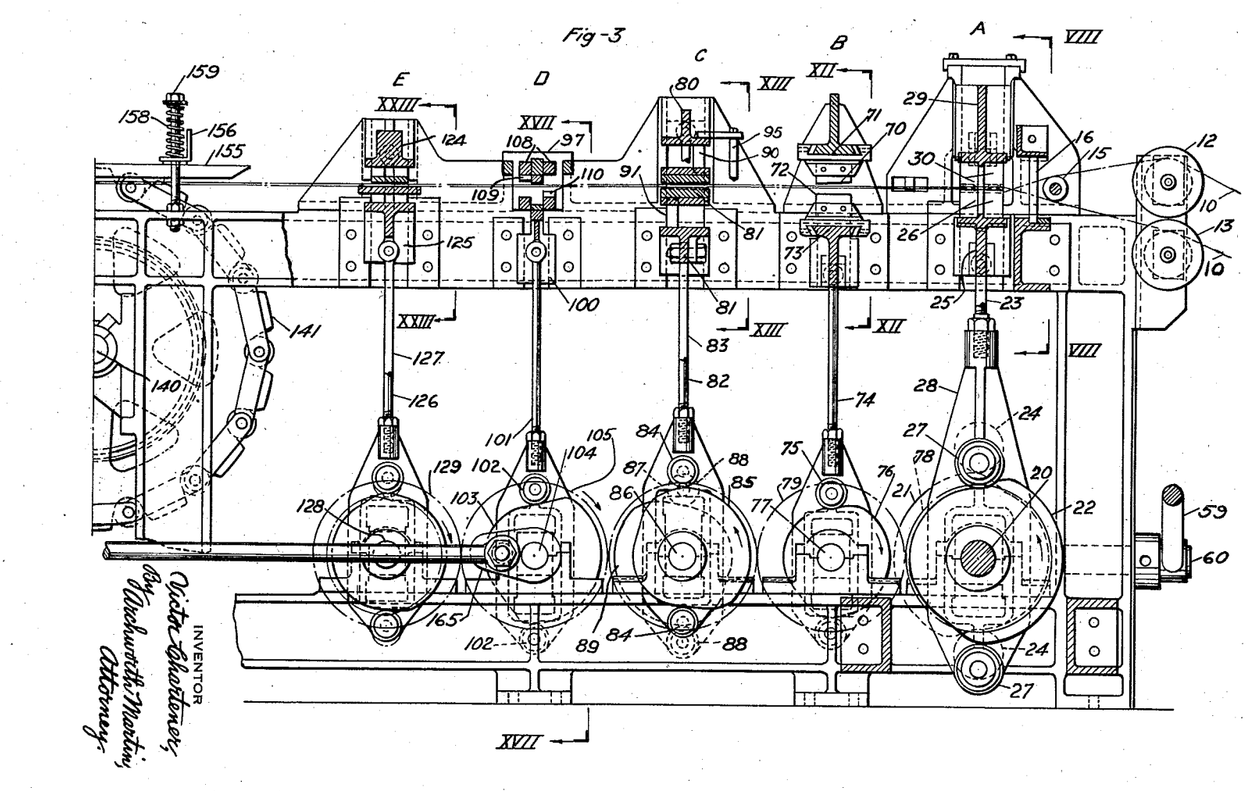

As shown more clearly in Figs. 1, 2 and 3, there is provided a feeding station A, a stay wire trimming station B, a first bending station C, a second bending station D, a third bending station E, a take-off station F, and a reeling station G. The strand wires 10 and stay wires 11 are fed into the machine as shown in Fig. 1, the stay wires being fed past a crimping station H, and then deposited between the strand wires 10 which are deflected at the station A, to permit the insertion of the stay wires beneath certain strands and above other strands, after which the stay wires are cut. The stay wires are cut a little longer than the length required to extend across the strands, so that in case the stays are not quite accurately positioned in directions transversely of the fabric, the allowance in extra length will permit the trimming at the station B, whereupon the extremities of these stays will project exactly the proper distance beyond the edges of the fabric.

Figures 24, 25:
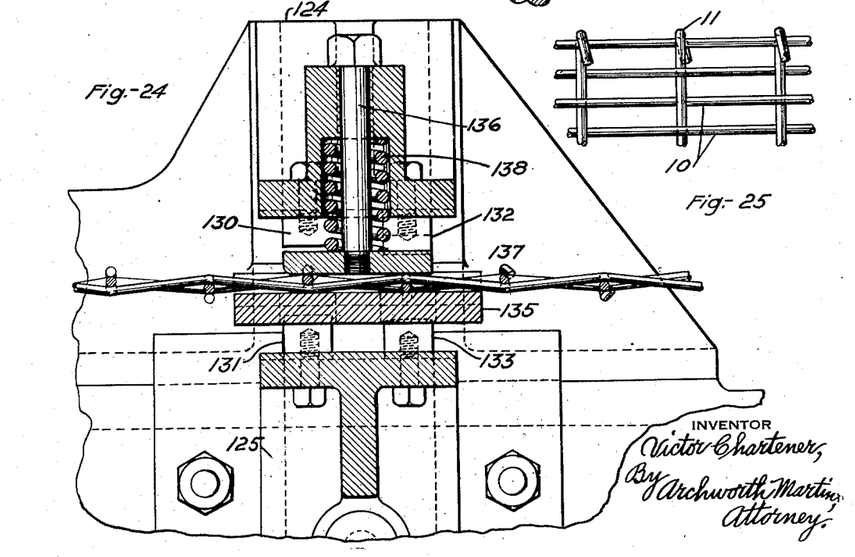
Fig. 24 is a view taken on the line XXIV—XXIV of Fig. 23.
Fig. 25 is a fragmentary view showing a portion of the fabric and the manner in which the ends of the stay wires are bent.
Figure 26:
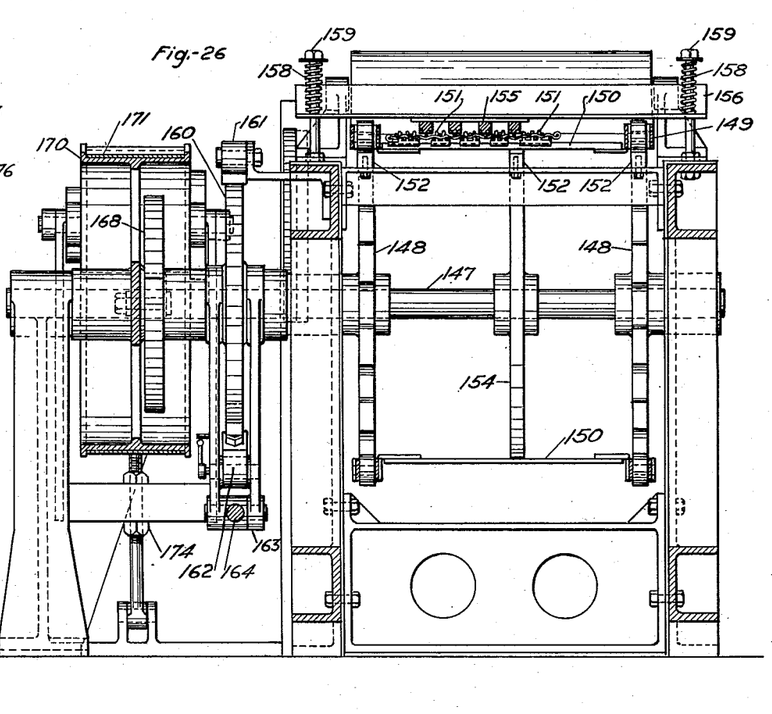
Fig. 26 is a view taken on the line XXVI—XXVI of Fig. 2.
Figure 27:
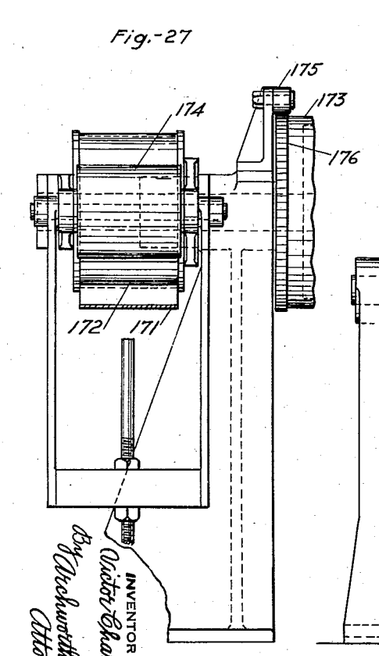
Fig. 27 is an end view of a portion of the take-off mechanism of Fig. 2.

At the station C, the protruding ends of the stay wires are bent at right angles to the plane of the fabric; at station D, they are bent back upon the plane of the fabric, and at station E, the bent back ends are slightly flattened as shown in Fig. 25. The mesh is intermittently advanced by the mechanism at station F and is taken off on a reel at station G, the reel being driven and also exerting a pulling force on the fabric.

Figure 4:
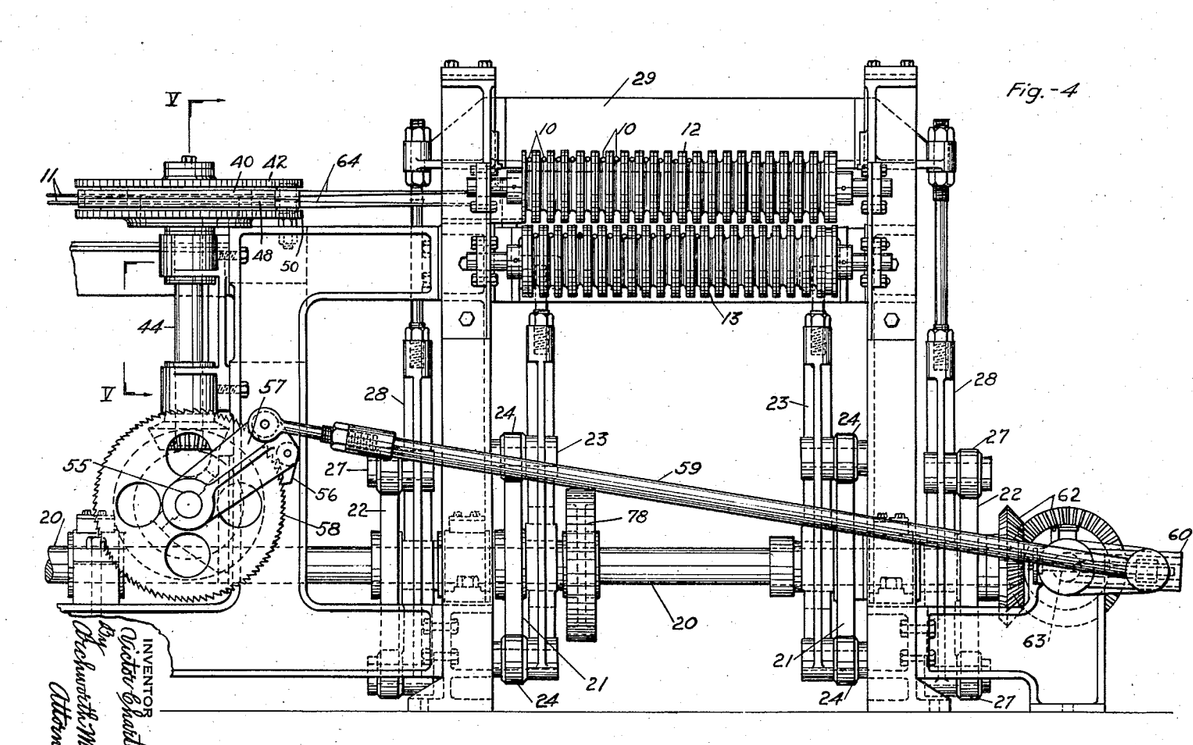
Fig. 4 is an end view at the feeding end of the machine.
Figure 5:
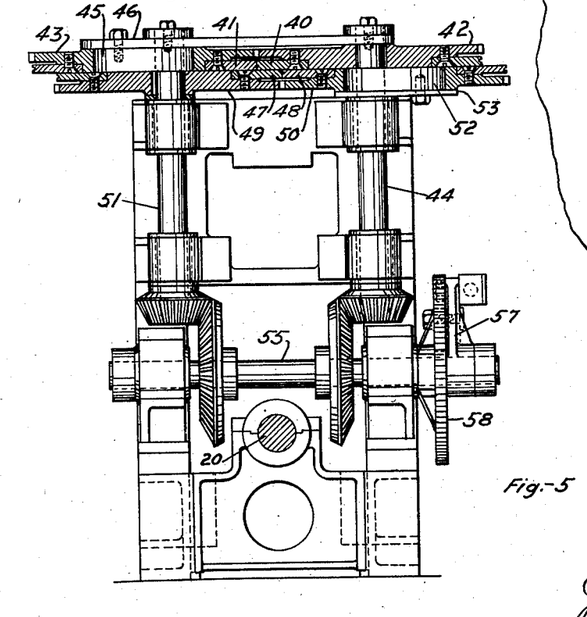
Fig. 5 is a view taken on the line V—V of Fig. 4.

As shown more clearly in Figs. 1, 3 and 4, the strand wires 10 are fed in two groups from suitable reels (not shown), one-half of the wires passing over upper guide rollers 12, and the other half over lower guide rolls 13, and past a spreader roll 15, and between the teeth or fingers of a comb 16 that maintains the wires in proper transversely-spaced relationship, as they enter between the deflecting dies in interspersed relation.

*Deflector dies for the strands*

The apparatus is mounted upon a suitable framework and is driven by a motor 18 operating through speed reduction gears at 19 that drive a shaft 20. The shaft 20 carries a pair of cams 21 for operating a lower set of deflector dies and a pair of cams 22 for operating an upper set of deflector dies. Slide blocks 23 are mounted in the frame for vertical movement and carry cam rollers 24 that engage the cam discs 21, so as to have positive up and down movements of the slide blocks during rotation of the shaft.

Figure 8:
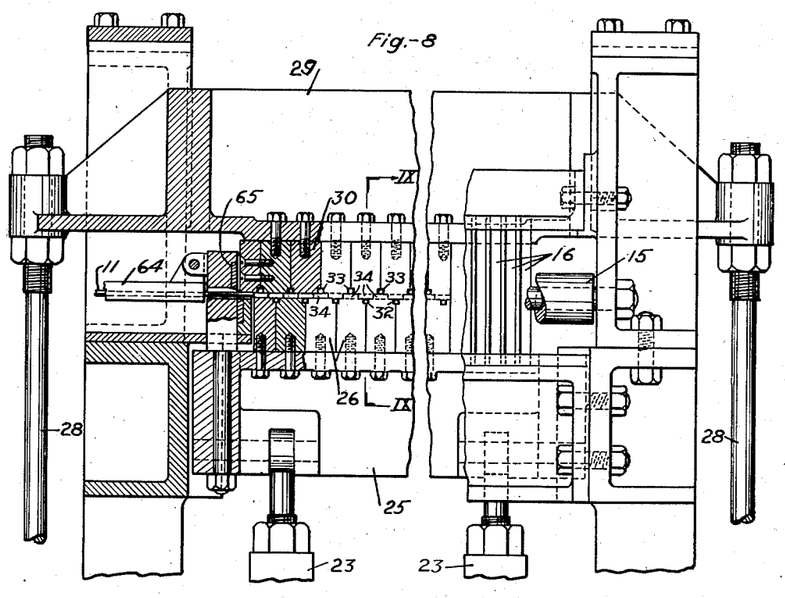
Fig. 8 is a view taken on the line VIII—VIII of Fig. 3.
Figures 9, 10:
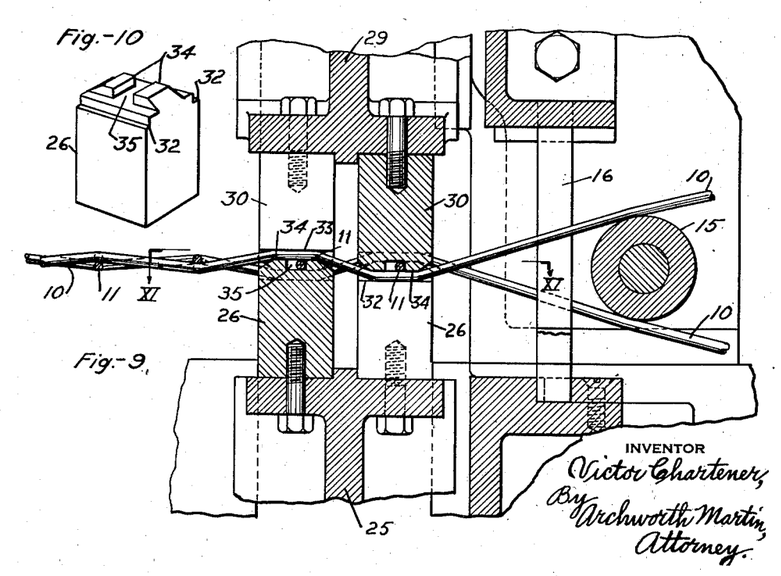
Fig. 9 is an enlarged view taken on the line IX—IX of Fig. 8.
Fig. 10 is a perspective view of one of the deflecting dies shown in Figs. 8 and 9.

At their upper ends (Figs. 3, 8 and 9), the blocks 23 carry a cross head 25 on which are mounted lower deflector dies 26 which are of the form shown in Fig. 10. The cross head 25 is suitably guided by the machine frame for vertical movements as shown more clearly in Fig. 3.

The cams 22 engage cam rollers 27 that are carried by slide blocks 28 on the upper end of which is mounted a cross head 29 that is slidably supported for vertical movement in the frame of the machine. The cross head 29 carries deflector dies 30 which are similar in shape to the dies 26, but which are in staggered relation thereto.

The dies 26 and 30 are each arranged in front and rear sets, as viewed in Fig. 9, the rear sets being staggered relative to the front sets, so that a rear die 26 as shown in Fig. 9 will deflect a strand wire upwardly, while the associated front die 26 is deflecting an adjacent strand wire upwardly. During this movement of the dies 26, the dies 30 will deflect the strand wires in opposite directions. In other words, while one of dies 26 is deflecting a strand wire upwardly at a given point, a die 30 is deflecting an adjacent strand wire downwardly at that point.

The blocks 26 and 30 are cut away at 32 and 33, respectively, to permit sufficient deflection of the strand wires, so that the stays may be fed between the oppositely deflected portions of adjacent strands. The blocks 26 and 30 are provided with bosses 34 that engage the strand wires to deflect the same, and are bevelled on their front and rear edges to prevent too abrupt bending of the strand wires and to facilitate advancing movement of the strands 10. The bosses 34 are spaced apart to provide channel ways or grooves 35 extending transversely of the machine, and into which the stay wires 11 are inserted.

After each operation of the deflector dies and the feeding of stay wires thereto, the strands are advanced as hereinafter described, a distance equal to double the spacing between the stays, thus if the stays are spaced two inches apart, the strands will be advanced four inches. The provision of front and rear sets of deflector dies constitutes an important feature of my invention, since it provides for insertion of two stay wires simultaneously, and thus doubles the rate at which the strand wires may be advanced. Furthermore, it simplifies the feeding of the strand wires since there need be no vertical transposition or shifting of paths of travel of the lower group of strand wires relative to the upper strand wires at the entrance to the machine.

*Stay wire feeding*

Figure 6:
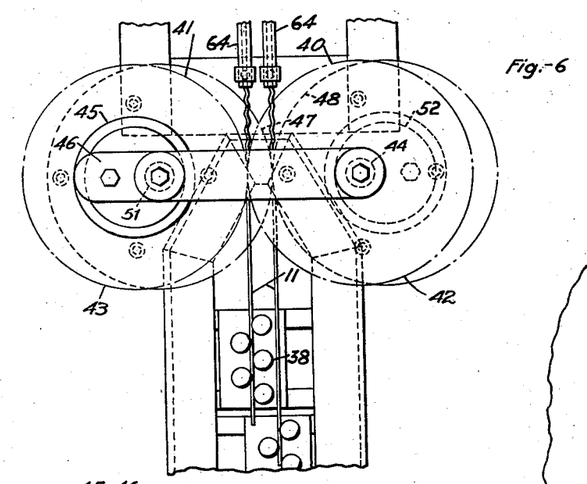
Fig. 6 is a plan view of the apparatus shown in Fig. 5.
Figure 7:
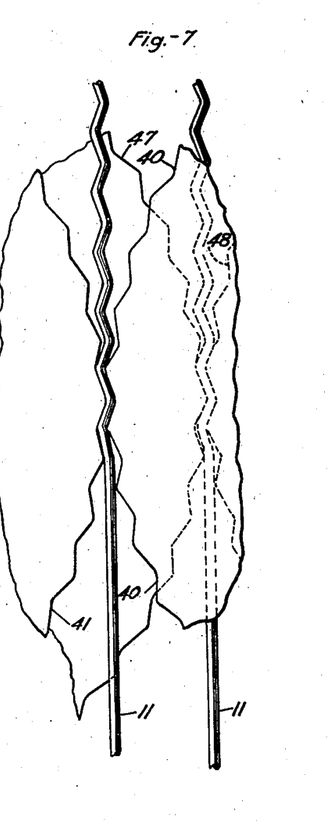
Fig. 7 is an enlarged view of the crimping rolls for the stay wires.

As shown more clearly in Figs. 1 and 4 to 7, the stay wires 11 are drawn from suitable reels past guide rollers 37 and straightening dies or rollers 38. The wires are drawn through the straightening dies by suitable crimping rollers which are arranged in upper and lower pairs, each pair operating upon one of the wires 11. The upper crimping dies 40 and 41 are of ring-like form, but serrated on their peripheries as shown in Fig. 7, and are secured by screws to driving gears 42 and 43, respectively. The gear 42 is keyed to a vertical shaft 44, and has driving engagement with the gear 43 that is loosely journalled on a hub 45 that is secured upon a bracket plate 46 by suitable screws.

It will be seen that as the shaft 44 is driven, the gears 42 and 43, and the crimping dies carried thereby will be rotated to advance one of the wires 11, and produce crimps therein, as shown more clearly in Figs. 6 and 7.

The other wire 11 is crimped by dies 47 and 48 which are mounted on gear members 49 and 50, respectively, the gear member 49 being driven by a shaft 51, while the gear member 50 is loosely supported on a hub 52 that is secured to a bracket plate 53.

While the gear wheels 42 and 49 are, of course, co-axial with their respective shafts, the gear wheel 43 and the crimping disc carried thereby are offset relative to the shaft 51, and the gear wheel 50 and crimping disc 48 are offset radially of the shaft 44, so that the pass between the crimping discs 40 and 41 and the pass between the crimping discs 47 and 48 are offset in such manner as to permit the crimped stays to be advanced to the deflector dies with proper spacing.

The shafts 44 and 51 have bevelled gear driving engagement with a shaft 55 that is intermittently rotated by a pawl 56 that is carried by a rocker arm 57 which is loosely mounted on the shaft 55. The pawl 56 engages the teeth of a ratchet 58 that is keyed to the shaft 55, so that as the arm 57 is oscillated, the shaft 55 will be given intermittent rotative movements. The arm 56 is operated by a pull rod 59 that has connection with a crank arm 60 which is carried by a shaft 61 which is driven through gear wheels 62 from the main drive shaft 20.

As shown more clearly in Fig. 4, the crank pin bearing by which the pull rod 59 is connected to the crank arm 60 is slidably supported in the crank arm and adjustable therein by means of a screw 63. Thus the effective throw of the crank connection can be varied, with consequent variation in the distance which the pawl 56 will periodically advance the ratchet wheel 58. By this means, stay wires of various desired lengths can be supplied.

From the crimping discs, the stay wires 11 are advanced through guide tubes 64 and past a cutter 65 (Figs. 8 and 11) which is carried by the cross head 25. When the stay wires 11 have been fed into the channels 35, while the deflector dies are in the position shown in Fig. 9, the cross heads 25 and 29 are moved apart to separate the dies, and during this movement, the knife 65 is carried down by the cross head 25 to cut the wires 11, and permitting advancing movement of the formed fabric by mechanism to be hereinafter described.

At the completion of an advancing movement of the fabric, the deflecting dies are brought together to deflect the strands as shown in Fig. 9, and the cam discs 21 and 22 are so formed that the deflecting dies will remain in that position while the pawl and ratchet feed is being actuated to advance the stays into the deflecting dies and between the strand wires.

The stays are crimped in horizontal directions so that they in effect lie on their sides as they are fed into the deflecting dies. The distance which the strand wires 10 have to be deflected vertically in order to receive the stays is therefore not substantially greater than the actual thickness of the stays. In this manner, I avoid the necessity of deflecting the strand wires such distance that they will become permanently bent or deformed within the dies 26 and 30, as would frequently be the case if the stay wires were fed in with their bends vertically disposed instead of horizontally. For example, with the stay wires crimped to the extent shown, and if fed with their bends vertically disposed, the strand wires would have to be deflected twice the distance shown in the drawings, in order to permit insertion of the stays.

There is considerable resilience or yieldability in the strand wires, especially if they be made of spring steel as is the case, so that when the deflecting dies are separated and the shear 65 has been actuated to sever the stays, the tension of the strand wires on the stays will automatically cause the stays to turn 90°, so that their bends are perpendicular to the plane of the mesh.

The resiliency of the strands 10 causes the sets of stays 11 to be held against shifting longitudinally of the strands 10, while the mesh is being advanced to the bending stations, since the strands extend in sinuous paths, and partially embrace the stays, with a gripping action.

Trimming mechanism

Figures 11, 12:
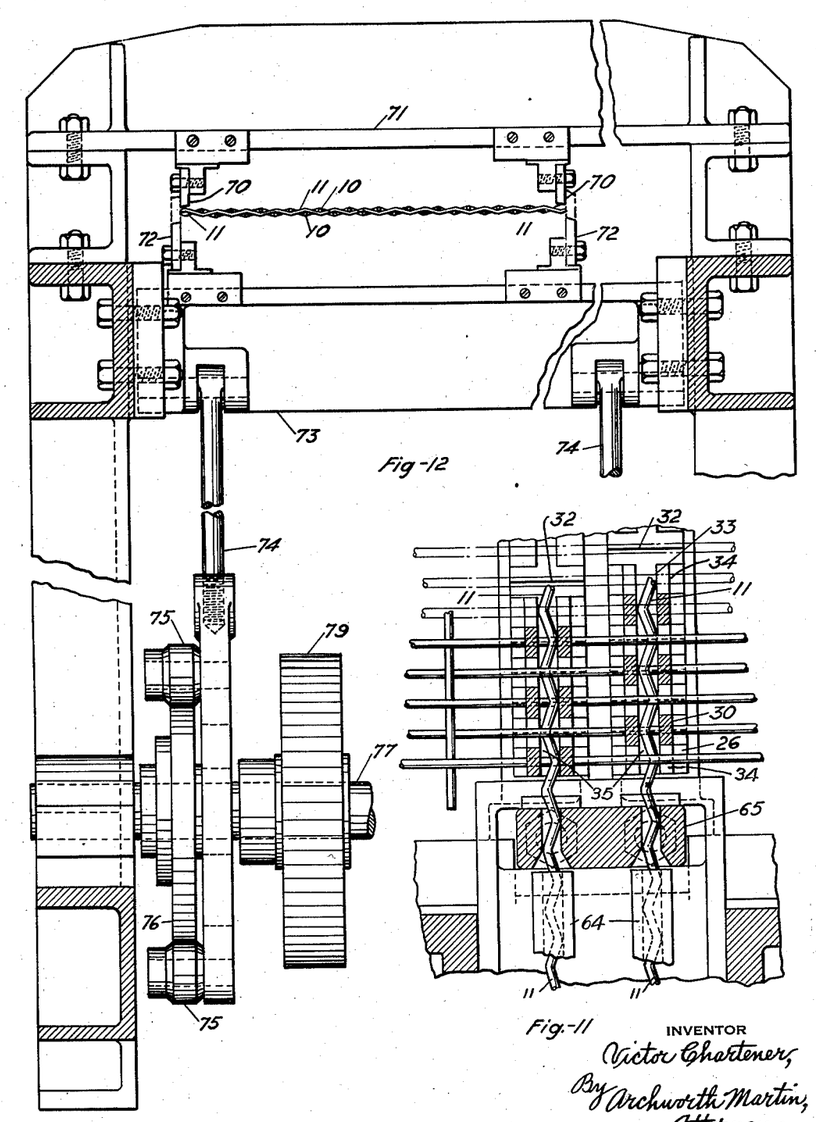
Fig. 11 is a view taken on the line XI—XI of Fig. 9.
Fig. 12 is a view taken on the line XII—XII of Fig. 3.
Figure 13:
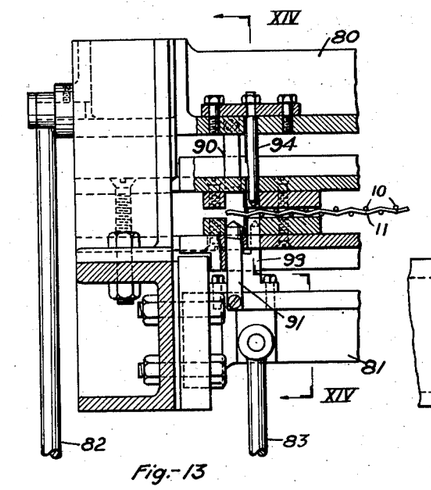
Fig. 13 is a view taken on the line XIII—XIII of Fig. 3.
Figure 14:
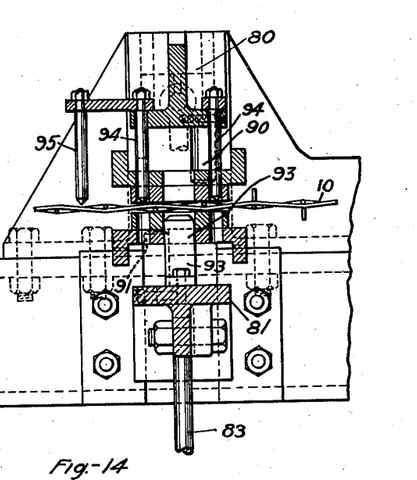
Fig. 14 is a view taken on the line XIV—XIV of Fig. 13.
Figure 15:
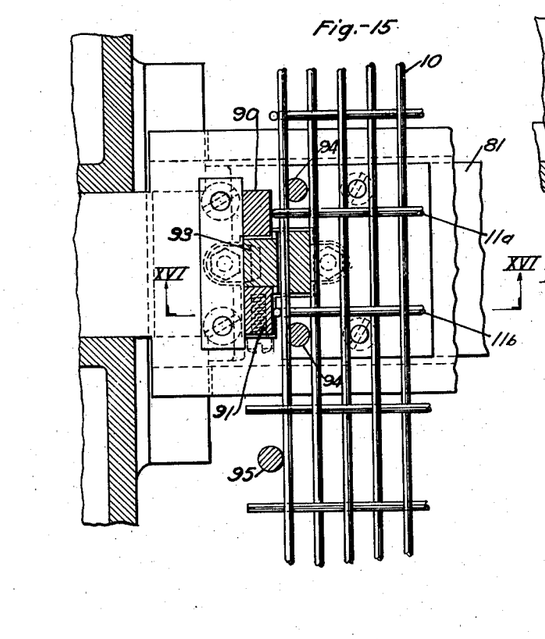
Fig. 15 is a view taken on the line XV—XV of Fig. 16.

Referring now to Figs. 3 and 12, and with particular reference to the trimming station B, which is utilized for trimming excess lengths from the ends of the stay wires 11, so that they will project uniform distances beyond the marginal strand wires 10, I provide a pair of stationary knives 70 mounted on a frame member 71, and a pair of movable knives 72 mounted on a cross head 73. The cross head 73 is reciprocated vertically by push bars 74 that carry cam rollers 75 which engage cam discs 76 that are mounted on a shaft 77. The shaft 77 is driven through gears 78 and 79 that are secured to the shafts 20 and 77, respectively. It will be understood that the cam 76 is so arranged that the knives 72 will be operated at the termination of each advancing movement of the mesh.

First bending operation

Referring now to Figs. 3, 13, 14, 15 and 16, and with particular reference to the first bending operation on the ends of the stay wires, I show means for bending the projecting ends of the stay wires at right angles to the plane of the mesh. Upper and lower cross heads 80 and 81 are slidably supported in the machine frame for vertical movements and are actuated by pairs of rods 82 and 83, respectively, the rods 82 carrying cam rollers 84 that engage with a cam disc 85 which is mounted on a shaft 86.

The shaft 86 is driven from the gear wheel 79, through a gear wheel 87 that is secured to the shaft 86. The rods 83 carry cam rollers 88 that engage cam discs 89 which are secured to the shaft 86. The cam discs 85 and 89 are so arranged that the cross head 80 is being moved down, while the cross head 81 is moving upwardly.

The upper cross head 80 has a pair of bending blocks 90 that are located at diagonally opposite corners of the cross head, so that when one of the blocks 90 (Fig. 15) is bending an end of a stay wire 11a (Fig. 15) downwardly, the other block 90 will be bending the opposite end of an adjacent stay wire 11b downwardly. Similarly, the crosshead 81 is provided with bending blocks 91 arranged at diagonally opposite corners of the cross head, so that when one block 91 is bending the end of the stay wire 11b upwardly, the other block 91 is bending the opposite end of the stay wire 11a upwardly.

It will thus be seen that as the cross heads 80 and 81 move together, the bending blocks 90 and 91 will bend the ends of stay wires 11a and 11b around the edge strand wires and into a position at right angles to the plane of the wires.

In order to maintain the edge or selvage strands against deflection during the bending operations, I provide on the cross head 81 an upstanding bifurcated supporting block 93 at each end of the cross head, so that when the cross head is raised, the blocks will straddle the edge strands 10, at points between the stay wires, to hold the edge strands against lateral deflection during the bending of the stays.

On the cross head 80, I mount depending guide pins 94 which when the cross head descends are moved along the inner sides of the marginal strand wires, and pins 95 which engage the outer sides of the marginal strand wires, the lower ends of these pins 94 and 95 being pointed so as to properly position the marginal strand wires at the bending station and serving to assist in preventing lateral deflection thereof during bending. The guide pins are of such length that they will pass between the strand wires before the bending blocks 90 and 91 engage the stays.

Second bending operation

Referring now to Figs. 3 and 17 to 22, I show mechanism for performing the bending operation at station B, whereby the projecting ends of the stays are bent from right angles back towards the plane of the mesh to embrace the edge strands thereof. Cross bars 97 are rigidly secured to the framework of the machine and serve as bracing members, and also are provided with recesses 98 for the reception of stop or guide pins 99 that prevent lateral shifting of the mesh strands, as in the case of the pins 94, at the first bending station.

The pins 99 are carried by a lower cross head 100 which is supported in the framework of the machine for vertical sliding movement, and is raised and lowered by means of a bar 101 at each end, the bars 101 carrying cam rollers 102 which engage cam discs 103 that are secured to a shaft 104. The shaft 104 carries a gear wheel 105 which is driven by the gear wheel 87, so that the cross head 100 is periodically raised and lowered.

The cross head 100 is moved vertically in order to periodically move the stop pins 99 into holding position with the fabric at the end of each advancing movement, a third stop pin 106 being provided between the stop pins 99.

A slide frame composed of cross bars 108 is mounted in the upper framework of the machine for reciprocating movement transversely of the framework, and carries an upper pair of bending dies 109, and a lower pair of bending dies 110, the dies of each pair being positioned diagonally opposite to one another, so that the die 109, for example, will bend an end of a stay wire back upon the plane of the fabric, while the diagonally opposite die 109 will bend the end of an adjacent stay wire back upon the plane of the fabric, and similarly with respect to the dies 110.

Supporting blocks 111 are provided opposite the bending dies 109 and supporting blocks 112 are provided opposite the bending dies 110, so that during a bending operation by a die 109, one of the blocks 111 will be in position below the bend to support the wire, while the end of the stay is being bent back, and the blocks 112 will similarly vertically support the wire when the dies 110 are operating.

The die slide is reciprocated by means of a rocking lever 113 which is pivoted at 114 to the frame of the machine and at its lower end carries a cam roller 115 that engages a cam 116. The cam 116 is secured to the shaft 104, and is so arranged that reciprocatory movements occur only during quiescent periods of the fabric.

Figure 20:
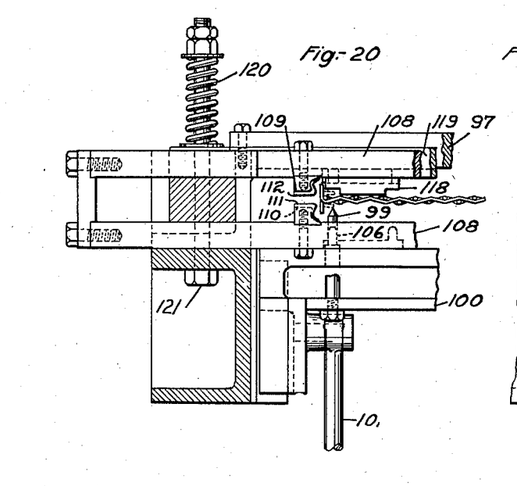
Fig. 20 is a view taken at right angles to the view of Fig. 19.
Figure 21:
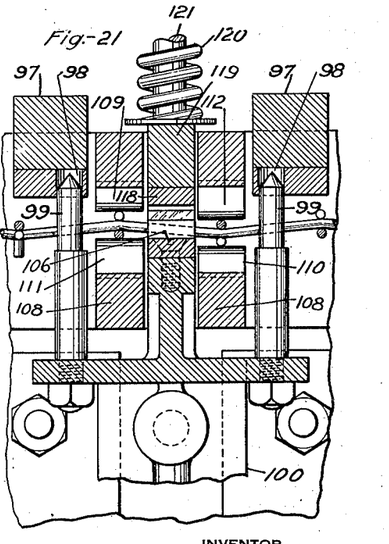
Figs. 21 and 22 are views similar to Figs. 19 and 20, respectively, but showing parts, on an enlarged scale, and in their actuated positions.
Figure 22:
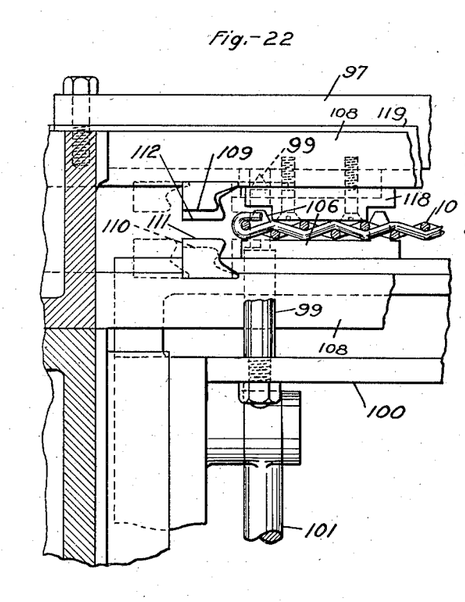
Figure 23:
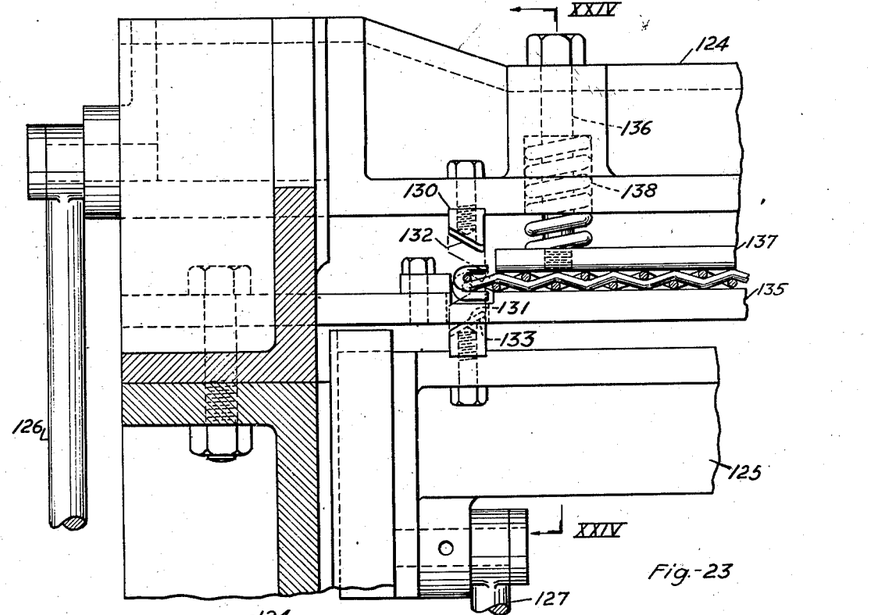
Fig. 23 is a view taken on the line XXIII—XXIII of Fig. 3, on an enlarged scale.

Upon movement of the slide 108 in one direction, a die 109 and a die 110 at one side of the machine will be brought respectively into engagement with two bent stays, and bend said ends from the positions shown in Fig. 20 to the positions shown in Fig. 22, movement of the slide in the opposite direction performing similar bending operations at the other ends of those stays. The cam 116 is of such contour that the slide 108 will be held at an intermediate position during advancing movement of the fabric.

In order to compensate for unevenness in the fabric and to assist in holding the same during bending operations, I provide clamping blocks 118 that are carried by a cross bar 119 which is yieldably held in downward projecting position by a spring 120 and a bolt 121. The member 106 cooperates with the block 118 to clamp the fabric therebetween, Fig. 22.

*Third bending operation*

Referring to the third bending operation at station E, I provide means for flattening somewhat the bends produced at station D, so that the stay wires will more firmly grip the marginal strand wires. The bending mechanism at this station (Figs. 3, 23, 24 and 25), includes an upper cross head 124 and a lower cross head 125, the said cross heads each being reciprocated vertically by pairs of push rods 126 and 127, respectively, which are operated through suitable cams that are mounted on a shaft 128 that carries a gear wheel 129 which is driven from the gear wheel 105.

The cross head 124 carries a pair of diagonally-positioned presser blocks 130, one of which will engage an upwardly bent stay wire 11 to flatten the same downwardly, and the other of which will engage the opposite end of an adjacent stay wire to bend or flatten the same downwardly. The cross head 125 carries blocks 131 that serve as anvil surfaces upon which the bending operations by the pressers 130 is performed, and also carries diagonally positioned presser blocks 133 for flattening the other stay bends upwardly. The cross head 124 carries anvil surfaces 132 upon which the bending blocks 133 will operate when bending a downturned end of a stay wire upwardly. The cross heads 124 and 125 move together simultaneously so that the lower blocks 133 are bending two downturned stays upwardly at opposite edges of the machine, while the dies 130 are bending the opposite ends of those particular stays downwardly.

In order to guide and hold the fabric in suitable position during bending operations, a plate 135 extends across the frame of the machine and is provided with openings through which the bending dies 130 and 133 and supporting blocks 131 may move. The cross head 124 loosely carries a bolt 136 adjacent to each edge of the fabric, the bolts in turn carrying a plate 137. Springs 138 are interposed between the plate and a recessed wall of the cross head to yieldably hold the bolts and the plate 137 in downwardly projected position. When the cross head 124 is lowered, the plate 137 will engage the fabric, and on further lowering movement, the springs 138 will be compressed to press the fabric against the plate 135 to more firmly hold the fabric while the bending operations are being performed.

At the completion of the bending operations heretofore described, the edges of the fabric will be substantially as shown in Fig. 25.

*Take-off and reeling stations*

Referring now to Figs. 1, 2, 3, 26 and 27, the fabric after it leaves the third bending station E is carried forward by the take-off mechanism and reeled on spools, ready for shipment.

The take-off mechanism comprises a conveyer structure embodying a shaft 140 journalled in the side frames of the machine, and upon which is mounted a pair of sprocket wheels 141. A brake drum 142 is secured to the shaft 140, and a brake band 143 cooperates therewith to prevent overrunning or further advancing movement of the conveyer when the advancing movement of the fabric is periodically interrupted. One end of the band 143 is connected to a bracket 144 and the other end is connected to a bolt 145 which loosely extends through the bracket and is encircled by a spring 146 which yieldably holds the band in braking position with a desired degree of tension.

At the front end of the conveyer a shaft 147 is journalled in the side frames and carries a pair of sprocket wheels 148. A pair of sprocket chains 149 passes around the sprockets 141 and 148. The conveyer chains are provided with anti-friction rollers that enter between teeth of the sprocket wheels, and are also provided at intervals with cross bars 150 secured to certain links of the chains. Each cross bar is provided with toothed blocks 151, the teeth of each entering into the mesh openings in the fabric, and engaging the stay wires to advance the fabric to the machine. Intermediate the pairs of sprocket wheels, guide rails or track bars 152 are mounted on the frame to prevent the upper runs of the chains from sagging.

On each of the shafts 140 and 147 is mounted a plain-faced disc 154 that engages intermediate portions of the cross bars 150, to support the same against sagging.

Above the upper run of the conveyer, I mount guide bars 155 upon cross bars 156, the bars 155 extending from the front end to the rear end of the conveyer in spaces between the teeth blocks 151, the bars bearing directly upon the fabric to hold it in engagement with the teeth of the blocks 151. The cross bars are yieldably held down by springs 158 that are carried by bolts 159 which are carried by and extend upwardly from the framework of the machine, so as to maintain the guide bars 155 in fabric-holding position.

A ratchet wheel 160 is secured to the shaft 147, and a weighted pawl 161 is provided to prevent back-lash or return movement of the wheel. The ratchet wheel 160 is driven by a spring-pressed pawl 162 which is pivotally connected to an arm 163 that is pivotally supported from the shaft 147, so that upon oscillatory movements of the arm 163, the conveyer will be given intermittent advancing movement. The arm 163 is oscillated by a rod 164 whose rear end is connected to a crank arm 165 that is secured to the shaft 104. A guide or hold-down roller 167 is provided for insuring continued movement of the fabric in a horizontal plane for a short distance beyond the conveyer. A ratchet wheel 168 is secured to the shaft 147, and has engagement with a pawl 169 that is pivotally mounted upon a belt pulley or drum 170.

As the ratchet wheel 160 and the shaft 147 are given intermittent advancing movements, the pulley 170 will be correspondingly advanced and rotated intermittently by the pawl 169, through ratchet wheel 168, so that step-by-step movements are imparted to a belt 171 that through a pulley 172 drives a take-up reel 173. A belt tightener 174 is provided and is so adjusted that there can be convenient slippage between the pulley 170 and the belt 171, since when a considerable body of fabric has been wound on the reel 173, the take-up movement of the reel will tend to exceed the rate at which the fabric is being formed on the machine, in which case there will be slippage of the pulley 170. Pawls 175 have engagement with a ratchet wheel 176 that is carried by the reel, for preventing back-lash or backward movement of the reel.

In Figs. 28 to 31, I show modifications of the stay-trimming and bending mechanisms whereby a plurality of narrow bands can be formed from what is initially produced at the entrance end of the machine as a substantially full-width band.

Figure 28:
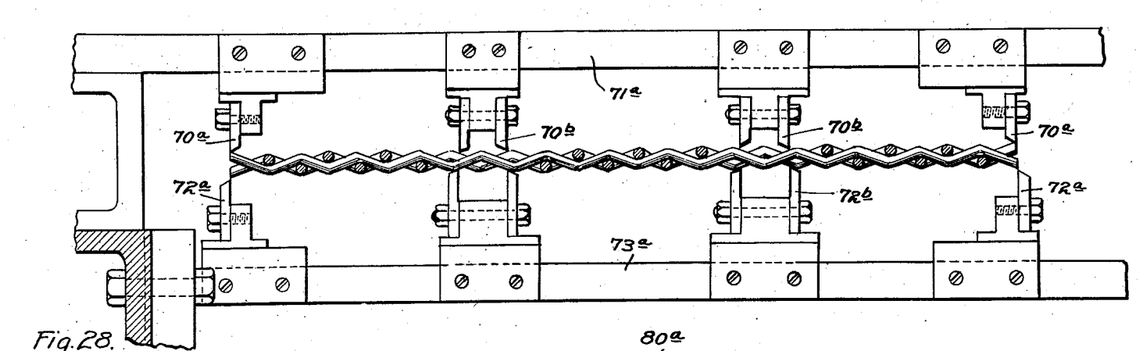
Fig. 28 is a cross-sectional view similar to Fig. 12, but showing a modification thereof.

As shown in Fig. 28, the cutter bar 71a is provided not only with end trimming knives 70a, as in Fig. 12, but is provided with intermediate knives 70b, arranged in pairs so as to cut intermediate sections out of the stay wire ends when trimming the ends of the wires. A reciprocable knife bar or cross head 73a corresponds to the bar 73 of Fig. 12, and is provided with knives 72b that cooperate with the knives 70b to cut sections from the stays. Certain of the strand wires are omitted at the points of cutting, as shown in Fig. 28. The single wide band is thus divided by the cutters into three narrow bands.

Figure 16:
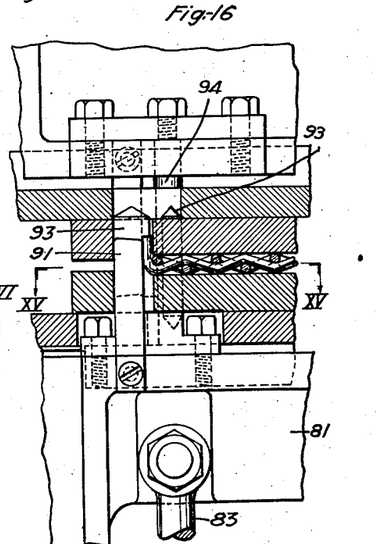
Fig. 16 is a view taken on the line XVI—XVI of Fig. 15.
Figure 17:
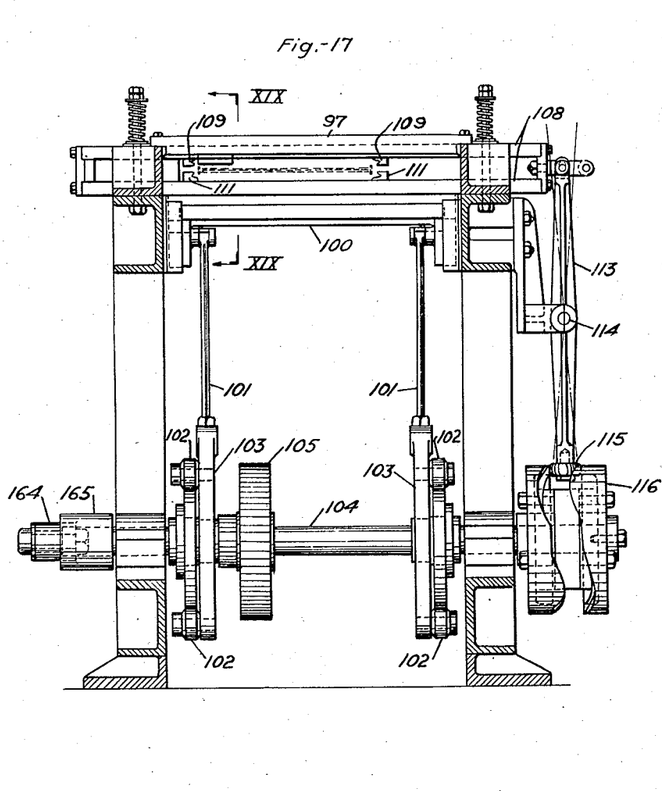
Fig. 17 is a view taken on the line XVII—XVII of Fig. 3.
Figure 18:
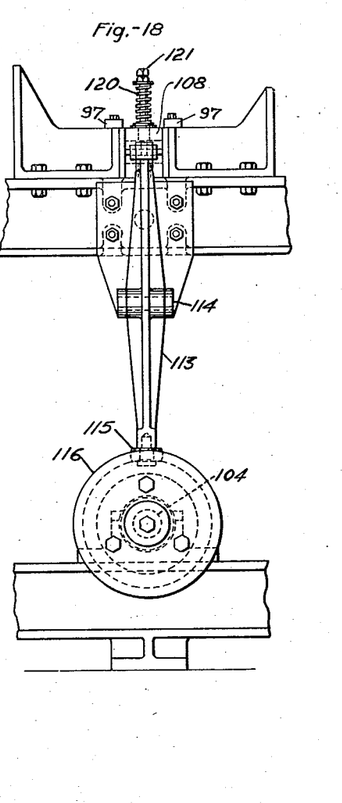
Fig. 18 is a side view of the structure of Fig. 17.
Figure 19:
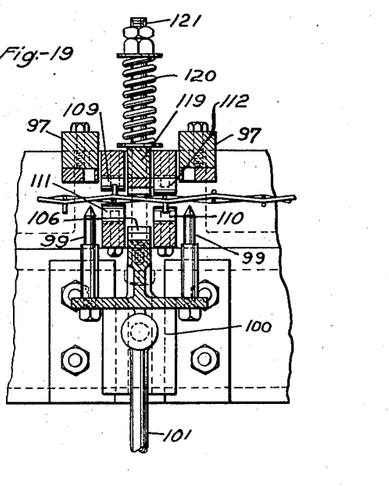
Fig. 19 is a view taken on the line XIX—XIX of Fig. 17.
Figure 29:
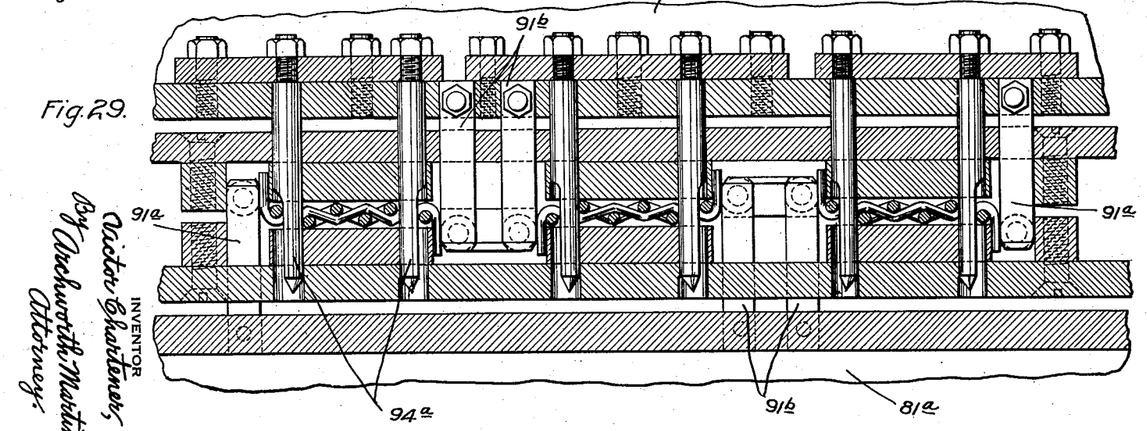
Fig. 29 is a vertical sectional view showing substantially a complete cross section of a modification of the structure of Fig. 16.

Fig. 29 is provided with bending elements 91a that bend the ends of the stays at right angles to the plane of the fabric, as in the case of the element 91 of Fig. 16. These bending elements 91a are carried on cross heads 80a and 81a that correspond to the cross-heads 80 and 81 of Figs. 14 and 15. A suitable number of guide pins 94a are provided for holding the strand wires against displacement during the bending operation. Additional bending elements 91b are mounted on the cross heads 80a and 81a to bend the intermediate ends of the stays in substantially the same manner as their outer extremities are bent.

Figures 30, 31:
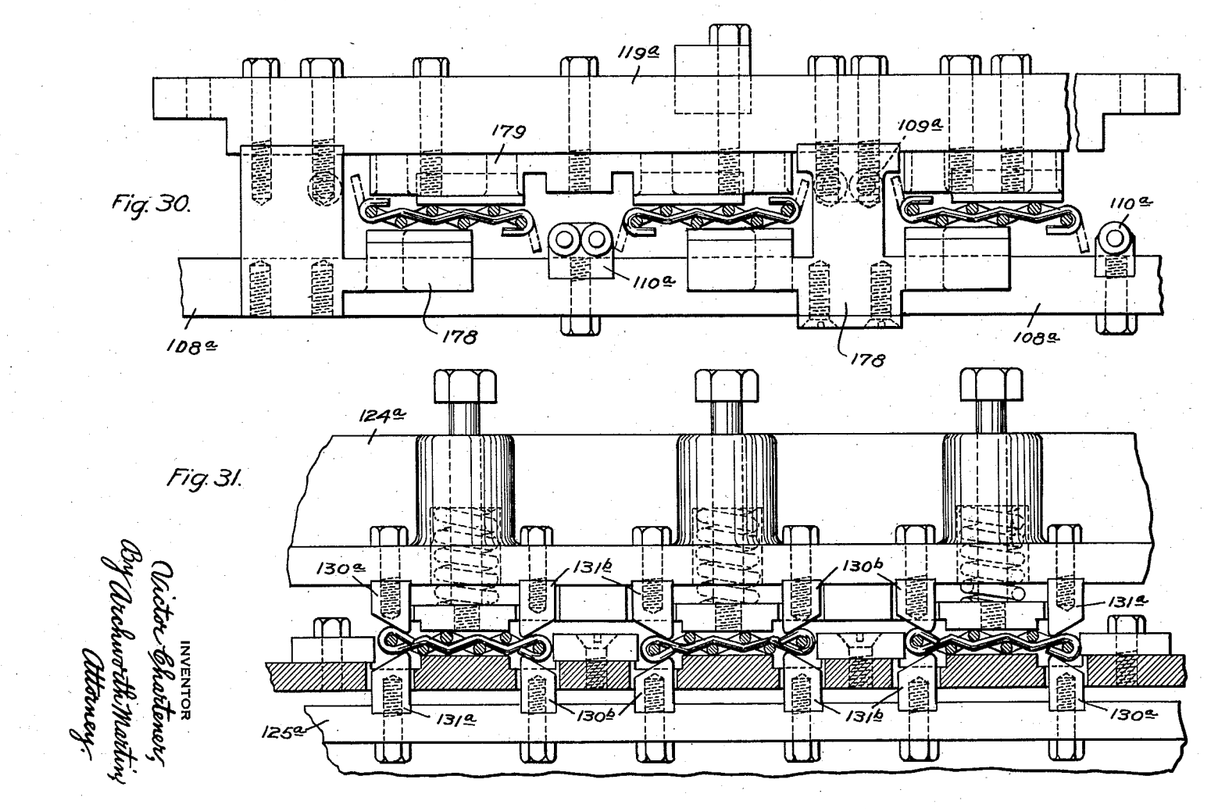
Fig. 30 is an elevational view showing a modification of the structure of Fig. 22.
Fig. 31 is a sectional elevational view showing a modification of the structure of Fig. 23.

Fig. 30 shows the second bending operation of the various stay sections, the parts being operated similarly to the operations heretofore described in connection with the discussion of Fig. 20, and under title "Second bending operation". The extreme outer ends of the stays are bent in substantially the same manner as described in said section of the specification. In order to bend the intermediate cut ends of the stays, I provide bending elements 110a and 109a that are secured to slide bars 108a, which are reciprocated transversely of the machine in the same manner as are the bars 108 of Fig. 17, to effect bending back of the cut ends to approximately the plane of the fabric. Suitable holding pins such as the pins 99 of Fig. 20 will be provided for supporting the strand wires during the bending operations. Blocks 178 are provided for supporting and guiding the wires, these blocks being mounted on brackets 119a. Upper guide blocks 179 are also supported by the bar 119a.

Referring now to Fig. 31, I show guide means for flattening the bent-back ends of the cut stays substantially as described heretofore under the title "Third bending operation". In this arrangement, the cross heads 124a and 125a, respectively, carry the pressers 130a and anvil blocks 131a which correspond to the elements 130 and 131 of Fig. 24. For the intermediate cut ends of the stays, I provide presser elements 130b and anvil blocks 131b.

It will thus be seen that I am enabled to form several widths of fabric simultaneously, through the use of a machine used also for forming wide fabric, and without greatly increasing the number of parts of the machine—by merely adding the intermediate cutting and bending elements to the respective cross heads.

I claim as my invention:—

1. Fabric-forming apparatus comprising means for advancing wire strands longitudinally to approximately a common plane, means for deflecting certain of said wire strands to form a space in the mid plane of the fabric, means for supplying stay wires, and means for crimping said wires and feeding them into said space, with the crimps disposed in a plane substantially parallel to the plane of the fabric.

2. Fabric-forming apparatus comprising means for advancing wire strands longitudinally to approximately a common plane, means for deflecting certain of said wire strands to form a space in the mid plane of the fabric, means for supplying stay wires, means for crimping said wires and feeding them into said space, with the crimps disposed in a plane substantially parallel to the plane of the fabric, and means for placing the strands under tension sufficient to move the deflected portions of said strands toward the mid plane of the fabric, a sufficient distance to engage the crimps of the stay wires and turn the stays so that their crimps are disposed in a plane approximately perpendicular to the plane of the fabric.

3. The method of forming fabric which comprises assembling wire strands in approximately a common plane, deflecting certain of said strands to form a space in the plane of the fabric, inserting a crimped stay into said space, with the crimps disposed in a plane approximately parallel to the plane of the fabric, and exerting a straightening force on the strands to force them into engagement with the stays, so as to turn the said crimps to a plane approximately perpendicular to the plane of the fabric.

VICTOR CHARTENER.